Jan. 18, 1944. H. C. DOANE 2,339,687
DIRECTION SIGNAL DEVICE
Filed May 1, 1941 2 Sheets-Sheet 1

Inventor
Harry C. Doane
By Blackmore, Spencer & Flint
Attorneys

Jan. 18, 1944. H. C. DOANE 2,339,687
DIRECTION SIGNAL DEVICE
Filed May 1, 1941 2 Sheets-Sheet 2

Inventor
Harry C. Doane
By Blackmore, Spencer & Flint
Attorneys

Patented Jan. 18, 1944

2,339,687

UNITED STATES PATENT OFFICE 2,339,687

DIRECTION SIGNAL DEVICE

Harry C. Doane, Flint, Mich., assignor to General Motors Corporation, Detroit, Mich., a corporation of Delaware Application May 1, 1941, Serial No. 391,326

1 Claim. (Cl. 177—329)

My invention relates to a signaling device of the type used on motor vehicles to indicate the driver's intentions of turning to the right or to the left.

An object of my invention is to provide a signaling device in which the illumination of the turn indicators is more intense in daylight than after dark.

Another object of my invention is to provide a signaling device which may be readily applied to existing vehicles without adding to the exterior equipment of the vehicle.

For further objects of my invention reference should be had to the accompanying specification and claim which explain and define my invention and to the accompanying drawings which illustrate the invention.

Fig. 1 of the drawings shows the elements of my invention installed in a standard passenger automobile.

Where only a light of some kind is required as an indicator at the rear of a vehicle, it is merely necessary that this light be visible at a reasonable distance. However, where this light is used to illuminate a signal having a definite configuration, such as an arrow, it has been found that a light of too great an intensity would obscure the outlines of the configuration and the arrow would appear merely as a bright light. A light which is of sufficient intensity to be clearly visible at a reasonable distance at night but which is not so strong as to obliterate the outlines of a desired configuration will be found to be inadequate to illuminate the configuration in the daytime because of insufficient contrast with ordinary daylight. It therefore becomes necessary to devise a signaling system which permits light of greater intensity in the signal indicator in the daytime than at night.

Figure 1:
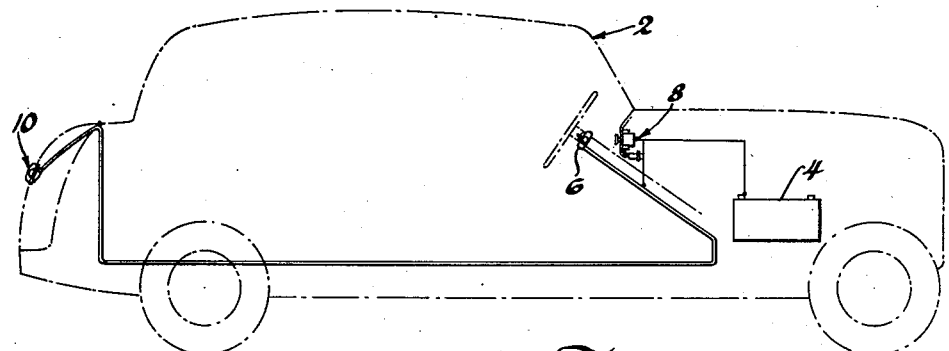

In Fig. 1, 2 is a standard passenger automobile equipped with my invention. 4 is a source of electrical energy such as a storage battery. 6 is a turn indicator switch mounted so as to be readily accessible to the operator of the vehicle. In this case it is fastened to the steering post in any suitable manner so as to be within easy reach of the driver's fingertips. The moving parts which make it possible to provide different degrees of intensities in the signal indicators are generally indicated by 8. The external fixture which carries the right and left signal lights is generally indicated by 10.

Figure 2:
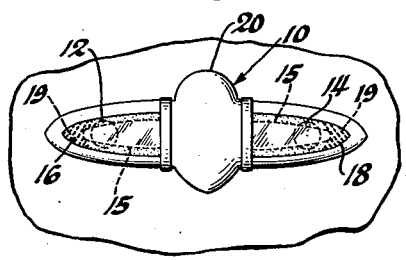
Fig. 2 is an enlarged view of the turn indicator.
Figure 2A:
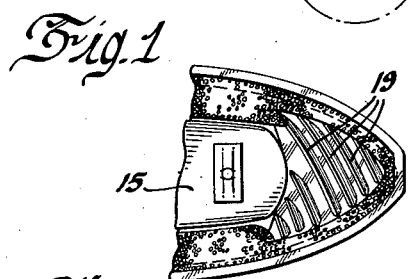
Fig. 2a is a view of the back, or inside, of one end of a cover glass.

As seen in Fig. 2, the right and left signal lights are mounted in a single fixture 10 which is fastened to the rear of the vehicle in such a position as to be readily visible to persons standing behind the vehicle. A bulb 12 serves as the left signal light and a similar bulb 14 as the right. Bulbs 12 and 14 are situated behind glass or plastic windows. An opaque section 15 on the inner side of each lens takes the form shown in dotted lines in Figure 2. This opaque section blocks off the passage of light through the central portion of the cover glass leaving a narrow transparent or translucent band at top and bottom. These bands converge to form arrowheads 16 and 18 in which is located a prism structure 19, best shown in Figure 2a. The purpose of this prism structure is intensification of the light at the arrowpoint to provide contrast with the remainder of the pattern. The opaque piece 15 may be held in place by any suitable anchoring means. The intermediate portion 20 may conveniently house a tail light 22 or it may merely serve to carry a name plate or coat of arms, or serve some other purpose such as a decorative one. If the tail light is housed in the member 20 this member will preferably be of translucent red glass.

Figure 3:
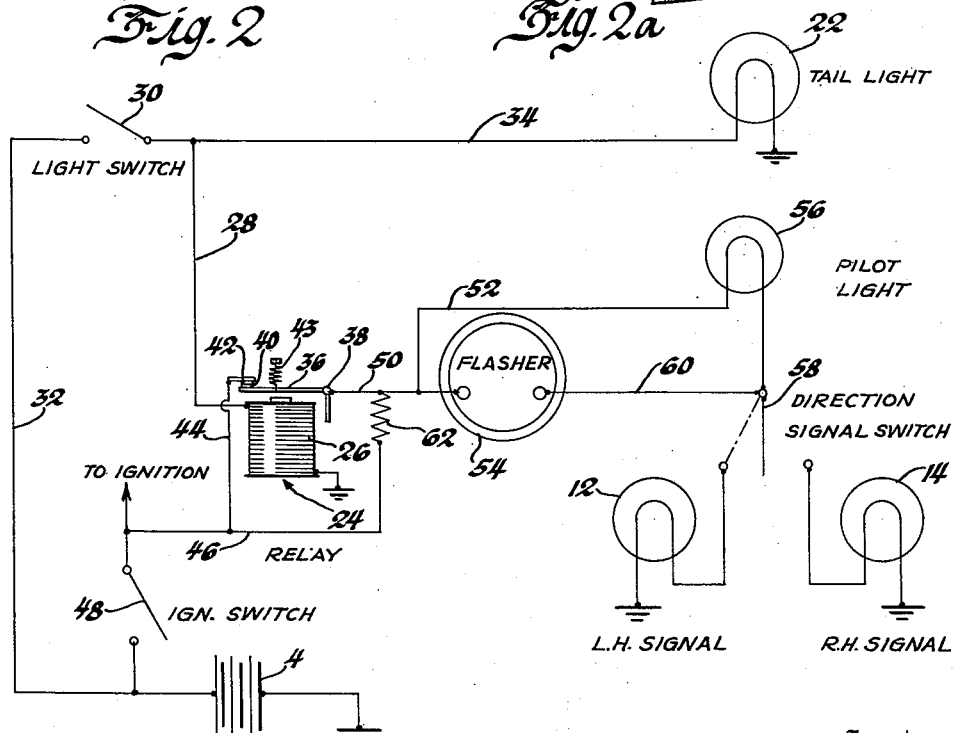
Fig. 3 is a circuit diagram of one embodiment of my invention.

The embodiment of my invention shown in Fig. 3 includes a relay designated generally by 24. This relay comprises an iron core electromagnet 26 connected by wire 28 to the main lighting circuit of the vehicle. The main light switch 30 is situated in this circuit between the battery 4 and the connection of wire 28 to the main light circuit. A wire 32 connects battery 4 with switch 30. A wire 34 connects switch 30 with tail light 22.

An armature 36, pivoted as at 38, carries a movable contact 40 which cooperates with a fixed contact 42. Means such as a spring 43 is provided to bias the contacts into closed relation. A wire 44 connects fixed contact 42 with another wire 46. The ignition switch 48 of the automobile is disposed between wire 46 and battery 4. Armature 36 is connected to wire 50 to which are connected wire 52 and a flasher or interrupter 54 of any conventional type. Wire 52 leads to a pilot light 56 which is located so as to be visible to the driver of the automobile. I may put pilot light 56 either on the instrument panel or in the casing which carries the moving parts for direction signal switch 58. A wire 60 connects the flasher 54 with the signal switch 58. Pilot light 56 is also connected to wire 60. It will be understood by those skilled in the art that pilot light 56 has a high resistance as compared to either of signal lights 12 or 14, in order that the latter will not be energized by current flow through the pilot light when the flasher is open-circuited.

A resistance 62 is located between wires 46 and 50 and parallels the connection through the contacts 42—40 and armature 36.

The operation of the signal system shown in Fig. 3 is as follows: with ignition switch 48 closed there is a voltage on line 46. With the main light switch 30 open there is no voltage on the coil 26. Armature 36 is biased by spring 43 into position to close contacts 42 and 40. Direction signal switch 58 may now be moved to either of its operative positions to complete a circuit to the selected signal light as follows: battery 4, ignition switch 48, wire 46, wire 44, fixed contact 42, movable contact 40, armature 36, wire 50, flasher 54, wire 60, signal switch 58, right or left signal light 14 or 12 respectively, and back to the battery through the ground. Because of the parallel connection between wire 50 and signal switch 58, pilot light 56 will also flash, indicating to the driver that the signal circuit is closed. Some current will also pass through resistance 62, but in view of the low resistance path through the contacts, the current passing through the high resistance 62 is of no consequence for this phase of the operation.

The current thus flowing through the signal light selected by direction signal switch 58 gives sufficient intensity of the light to contrast with the surrounding daylight, making arrow 16 or 18 clearly discernible. If this same current flowed through the signal light at night, the illuminating bulb 12 or 14 selected by switch 58 would burn so brilliantly as to appear merely as a very bright light.

But with my invention, when the vehicle is operated at night, light switch 30 is in its on position, energizing electromagnet 26. Armature 36 is attracted to the electromagnet and movable contact 40 is pulled out of engagement with fixed contact 42. A circuit to the selected signal light in that case is through the resistance 62. This gives a decreased intensity of the signal light and makes the arrow clearly discernible to observers behind the vehicle.

It is evident that this embodiment of my invention can easily be installed on vehicles already in existence. The elements of the invention can readily be attached to the vehicle and connected, by appropriate wiring, to the equipment originally furnished with the vehicle.

Figure 4:
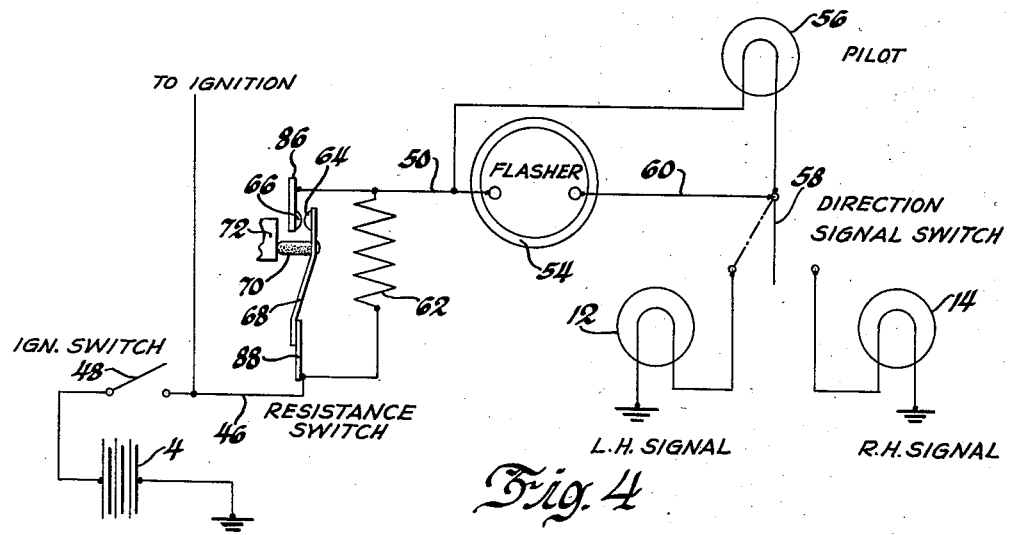
Fig. 4 is a circuit diagram of another embodiment of my invention.
Figure 5:
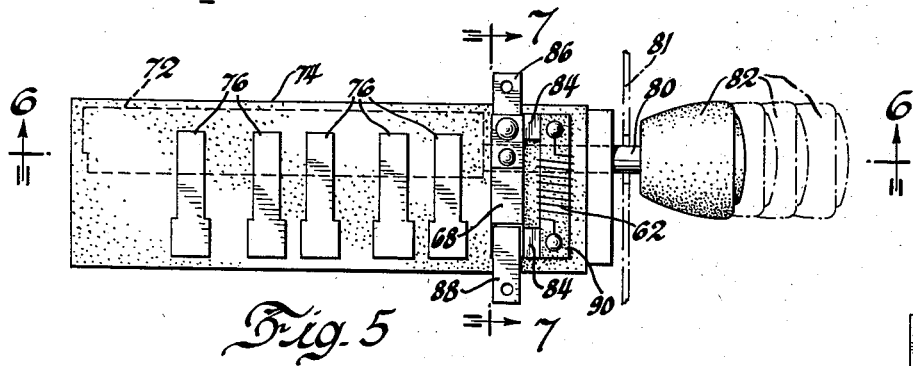
Fig. 5 is a plan view of a main lighting switch showing structural details of the embodiment of my invention diagrammed in Fig. 4.

In Fig. 4 is shown a circuit diagram of another embodiment of my invention. The circuit in this case is substantially the same as that shown in Fig. 3. The principal difference is in the method of separating the contacts shunted about resistance 62. In this embodiment, a switch having a movable contact 64 and a fixed contact 66 is connected in parallel with resistance 62 between wires 50 and 46. Movable contact 64 is mounted on a leaf spring 68 of a suitable conducting material. Spring 68 carries a tongue 70 which is engaged by a sliding member 72 of the main lighting switch. This switch is shown in detail in Figs. 5 to 7.

Figure 6:
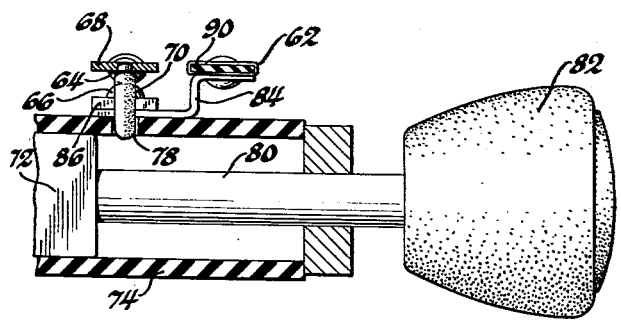
Fig. 6 is a view with parts broken away and in section substantially on the line 6—6 of Fig. 5.
Figure 7:
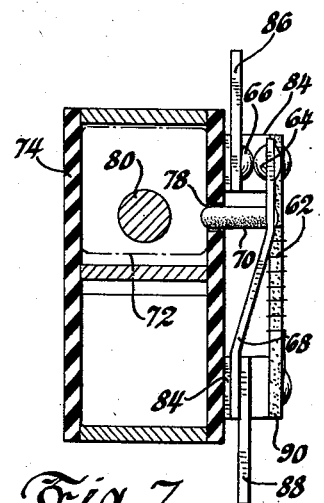
Fig. 7 is a view in section substantially on the line 7—7 of Fig. 5.

The lighting switch illustrated in this embodiment of my invention is a conventional push-pull type having a sliding member 72 which reciprocates in a housing 74. This housing is made of a suitable insulating material and carries a number of terminals 76 to which are connected wires leading to the various headlight and taillight filaments. An opening 78 is provided in one wall of the housing. Tongue member 70 of spring 68 projects through opening 78 as seen in Figs. 6 and 7. The disposition of the opening is such that tongue 70 will be engaged by slider 72 in any of the on positions of the switch. A rod 80 is attached to slider 72. Switch housing 74 is attached to some point on the vehicle body to make it readily accessible to the driver. For example, it may conveniently be attached at the rear of the instrument panel, shown in dotted lines as 81 of Fig. 5, in such a manner as to permit rod 80 to project through to the front of the instrument panel. A button 82 is provided on the end of rod 80 to permit reciprocation of rod 80 and slider 72. To put the switch into any of its on positions button 82 is pulled outward, or away from the instrument panel, pulling with it rod 80 and slider 72. In any switch on position, slider 72 pushes tongue member 70 away from the housing against the bias of spring 68, moving contact 64 out of engagement with fixed contact 66 and breaking the shunt circuit around resistance 62; resistance 62 is then the sole path for the current between wires 46 and 50. Contacts 64 and 66 and resistance 62 are conveniently fastened to the switch housing by a bracket 84 having lugs 86 and 88 to which are attached wires 46 and 50. Bracket 84 also carries a strip 90 of insulating material, upon which is wound the wire which comprises resistance 62.

Although the operation of this embodiment of my invention is obvious from the description already given, it might be well to recapitulate briefly at this point. For daylight driving the lighting switch for the main lighting circuit will normally be in its off position and slider 72 will be out of contact with tongue 70; see Fig. 6. In this position contacts 64 and 66 are in engagement. If now, the driver of the vehicle turns right or left, he manipulates the signal switch 58 to indicate the direction of the intended turn. The circuit thereupon established is from battery 4 through ignition switch 48, wire 46, contacts 64 and 66, wire 50, flasher 54, wire 60, signal switch 58, the selected signal lamp, and back to the battery through the ground. As explained in connection with the circuit shown in Fig. 3, there is some current flow through resistance 62 in this case but for the purposes of this phase of the operation this current flow is of no consequence. As in the circuit of Fig. 3, pilot light 56 also burns to indicate that the direction signal switch has completed a circuit to one of the signal lamps. The current through the selected signal lamp gives sufficient brilliance to make the arrow in the colored glass clearly discernible in spite of the surrounding daylight. If now, this surrounding daylight is diminished by heavy clouds or the approach of night the driver pulls button 82 outward to put the lighting switch into one of its on positions, slider 72 engages tongue 70, separating contacts 64 and 66. The sole path for the current from wire 46 to wire 50 is then the resistance 62. With this resistance in series with the selected signal lamp, the current through the signal lamp is reduced, reducing the intensity of illumination of this lamp. Resistance 62 is so chosen as to make the intensity sufficient to make the signal visible at a reasonable distance, without permitting the selected lamp to burn bright enough to destroy or obscure the outlines of the arrows in the cover glass.

As explained above, the embodiment shown in Fig. 3 of the drawings lends itself to easy attachment to existing vehicles. The embodiment shown in Figs. 4 to 7 could likewise be used in existing vehicles, but I contemplate using this embodiment mainly where the invention is installed as part of the standard equipment of the vehicle.

Modifications and changes in my invention will be readily apparent to those skilled in the art. For example, it might be desirable to connect wire 46 directly to the battery instead of making the ignition switch part of the direction signal circuit.

Other modifications and changes will become apparent to those skilled in the art and I aim to define the true scope of my invention in the appended claim.

I claim:

In a lighting system for vehicles including a lighting circuit with a battery and a main lighting switch selectively movable to a plurality of positions for connecting said lighting circuit to said battery in different manners and a direction signal system including right and left turn signal lamps with a signal circuit including said battery, a periodic interrupter switch, and a turn indicator switch between said interrupter switch and said respective signal lamps to selectively energize either of said signal lamps, the combination of a further switch having a resistance in parallel therewith, said further switch and resistance being interposed in said signal circuit between said battery and said interrupter switch, said further switch being normally closed thereby shunting the resistance, and means for opening said further switch in response to the movement of said main lighting switch to any one of said positions to break the parallel circuit through said further switch to thereby reduce the amount of energy to said interrupter switch and reduce the intensity of the selected signal lamp whenever the lighting circuit is closed by said main lighting switch.

HARRY C. DOANE.